United States Patent [19]

Doing

[11] Patent Number: 5,214,268
[45] Date of Patent: May 25, 1993

[54] APPARATUS FOR PROGRAMMING A BAR CODE READER

[75] Inventor: Park Doing, Ithaca, N.Y.

[73] Assignee: NCR Corporation, Dayton, Ohio

[21] Appl. No.: 745,309

[22] Filed: Aug. 15, 1991

[51] Int. Cl.⁵ .............................................. G06K 7/10
[52] U.S. Cl. .................................... 235/472; 235/462
[58] Field of Search .................... 235/472, 462, 454

[56] References Cited

U.S. PATENT DOCUMENTS

| | | | |
|---|---|---|---|
| 4,402,088 | 8/1983 | McWaters et al. | 392/68 |
| 4,408,344 | 10/1983 | McWaters et al. | 382/62 |
| 4,538,072 | 8/1985 | Immler et al. | 250/568 |
| 4,581,761 | 4/1986 | Ichinokawa et al. | 382/13 |
| 4,593,186 | 6/1986 | Swartz et al. | 235/472 |
| 4,721,849 | 1/1988 | Davis et al. | 235/472 |
| 4,736,096 | 4/1988 | Ushikubo | 235/472 |
| 4,748,317 | 5/1988 | Satoh | 235/462 |
| 4,825,058 | 4/1989 | Poland | 235/472 |
| 4,861,972 | 8/1989 | Elliott et al. | 235/462 |
| 4,879,540 | 11/1989 | Ushikubo | 235/472 |
| 4,902,883 | 2/1990 | Poland | 235/462 |

FOREIGN PATENT DOCUMENTS

| | | | |
|---|---|---|---|
| 3080380 | 4/1991 | Japan | 235/462 |
| 4038583 | 2/1992 | Japan | 235/462 |
| 2228641 | 8/1990 | United Kingdom . | |

Primary Examiner—John Shepperd
Assistant Examiner—Esther Chin
Attorney, Agent, or Firm—Richard W. Lavin

[57] ABSTRACT

The present invention is directed to a method and apparatus for programming an optical bar code reader. The method includes the steps of storing programming binary data in a storage device, coupling a light emitting diode to the storage device enabling the diode to be operated in accordance with the binary data stored in the storage means and scanning the diode with a bar code reader enabling the bar code reader to be programmed in response to reading the scanned binary data. The apparatus includes a processor which stores programming data in a EEPROM which is operated to output binary data to a light emitting diode enabling the diode to operate upon receiving a binary one bit and disabled upon receiving a binary zero bit which condition is read by the bar code reader for use in programming the reader.

3 Claims, 3 Drawing Sheets

APPARATUS FOR PROGRAMMING A BAR CODE READER

BACKGROUND OF THE INVENTION

The present invention relates to optical bar code scanners, and more particularly relates to a method for programming the operation of an optical bar code scanner.

The use of bar coded symbols or labels intended to be read by optical scanning equipment as a means for identifying data useful in processing items sold in the retail system has been widely accepted to the point that a particular bar code known as a Universal Product Code (UPC) has been established as the industry standard for the grocery and other related retail industries. In multiple bar code systems, such as UPC, each decimal number or character is represented by two pairs of vertical bars and spaces within a 7-bit pattern wherein a binary 1 bit represents a dark module or bar of a predetermined width and a binary zero represents a light module or space. Thus, the decimal or character 1 may be represented in the UPC code by the 7-bit pattern 0011001. In keeping with this format, the decimal 1 would be comprised of an initial space of a 2-bit width, followed by a 2-bit wide bar, another 2-bit space and a 1-bit wide bar.

A multiple bar code, such as the UPC, is normally read by an optical scanner which may take the form of a hand-held wand or a scanner mechanism located in a check-out counter. The optical scanner will scan the bar code patterns and generate signals representing the bars and spaces for transmission to the processing apparatus which determines the character represented by the bar code pattern.

In the manufacture of the bar code scanner, the scanner is initially programmed to read a tag, to send the coded data to a remote microprocessor, to operate the laser and also the motor which operates a portion of the scanning optics producing a scan pattern for scanning the coded label. One method of programming a scanner is found in U.S. Pat. No. 4,868,375 issued to D. Blanford and which is assigned to the assignee of the present invention discloses reading bar code labels for changing the program of the scanner. After the scanner has been installed in a checkout environment, conditions arise which require that certain functions of the scanner be changed. For example, the type of coded tag that is to be read might be changed requiring a different decoding system, the length of the tag may change and the communication interfaces together with the baud rate may be changed. Where these changes have occurred in the past, a service person was required to make such changes to the scanner.

It would be desirable to provide a method for altering the scanner functions which is simple and effective and does not require the services of a technician to make such changes.

SUMMARY OF THE INVENTION

There is provided a method for changing the functions of a bar code scanner which generates coded data by reading a bar code symbol comprising bars and spaces, comprising the steps of programming a storage member with data representing the program changes, coupling the storage member to a light emitting diode (LED) which is operated by the storage member to be enabled when a binary 1 data bit is outputted to the LED by the storage member and to be disabled when a binary 0 is outputted, operating the hand held scanner in a scanning mode and positioning the scanner adjacent the LED enabling the scanner to read the on and off condition of the LED enabling the scanner to be programmed by means of the data read.

It is accordingly a principal object of the present invention to provide a method for changing the functions of a bar code scanner which can be accomplished by the operator.

Another object of the present invention is to provide a method for changing the functions of a bar code scanner which is simple in its operation and low in cost.

BRIEF DESCRIPTION OF THE DRAWINGS

These and other objects, features and advantages of the invention, as well as the invention itself, will become more apparent to those skilled in the art in light of the following detailed description taken into consideration with the accompanying drawings wherein like reference numerals indicate like or corresponding parts throughout the several views in which.

DESCRIPTION OF THE PREFERRED EMBODIMENT

Figure 1:
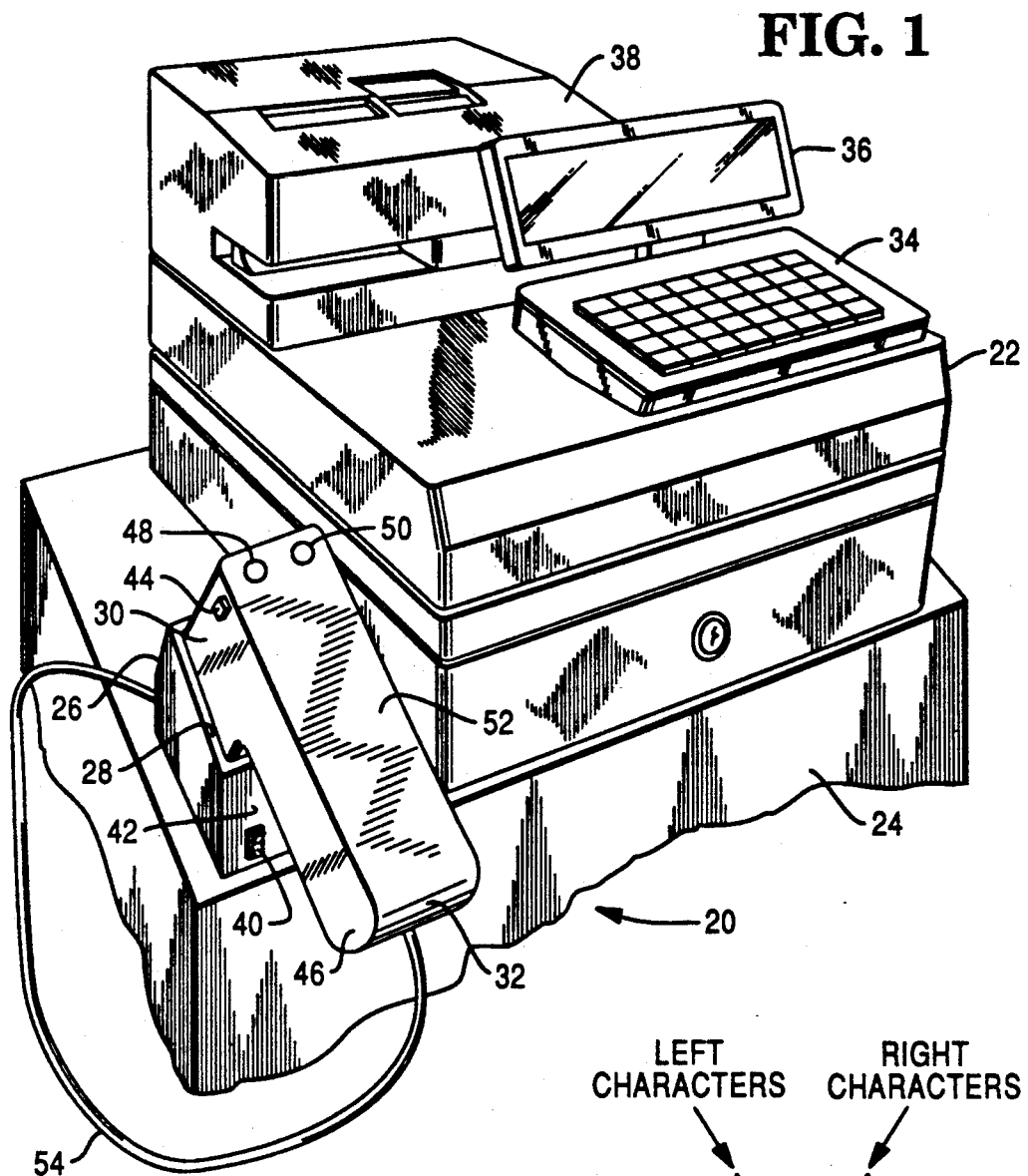
FIG. 1 is a perspective view of a checkout system including a data terminal device and a handheld scanner mounted in a support member positioned adjacent the terminal device.

Referring now to FIG. 1, there is shown a perspective view of a checkout system generally indicated by the numeral 20 which includes a data terminal device 22 mounted on a checkout counter 24 on which is also mounted a box like support member 26 having an opening 28 in which is positioned the face portion 30 of a hand-held scanner 32. The data terminal device 22 includes a keyboard 34, a display 36 and a printer 38. The support member 26 includes a switch member 40 mounted in the front face portion 42 of the support member 26. The scanner 32 includes a switch 44 mounted on the side portion 46 of the scanner and a pair of indicators 48, 50 comprising red and green lights mounted on the rear portion 52 of the scanner indicating whether a good or bad read operation had occurred. A cable 54 connects the optical scanner 32 and the support member 26.

Figure 2:
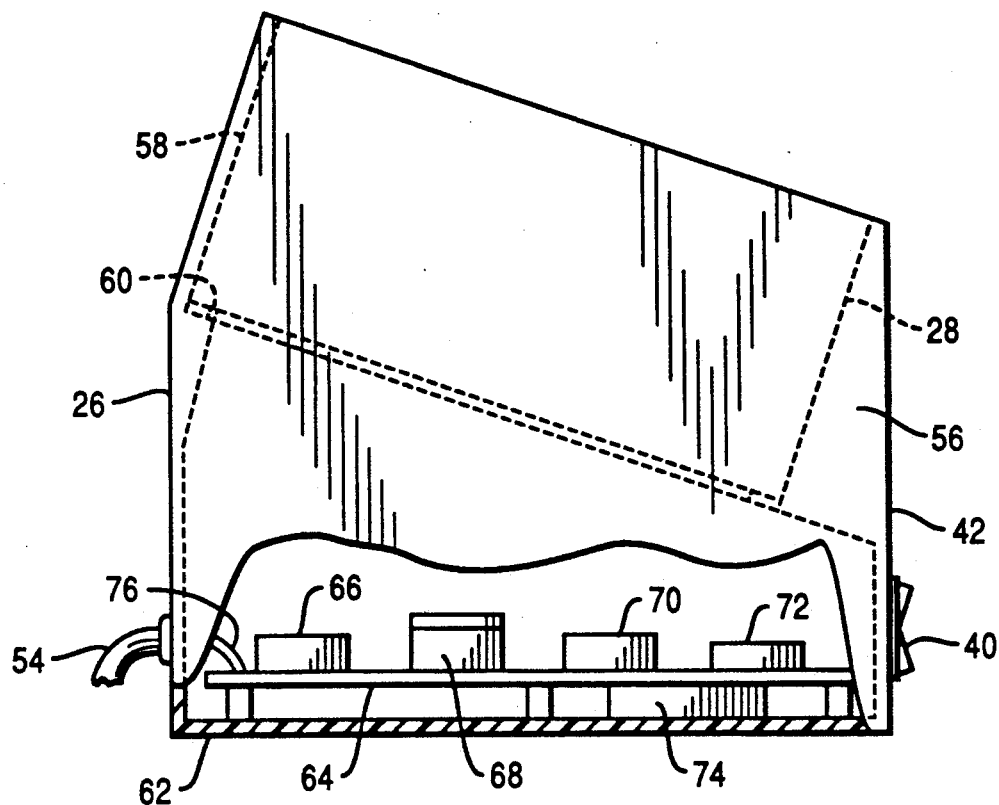
FIG. 2 is a partial sectional view of the support member showing the printed circuit board on which is mounted a central processing unit, the EEPROM member and the LED member.

Referring now to FIG. 2, there is shown a side sectional view of the support member 26 comprising a box like housing 56 which includes a recessed portion 58 forming the opening 28. Mounted at the lower portion of the recess portion 58 is a ring type support member 60 for supporting the face portion 30 (FIG. 1) of the scanner 32 adjacent the support member 60. As shown in FIG. 2, the recessed portion 58 is oriented at an angle to the vertical sides of the housing 56.

Mounted on the floor portion 62 of the housing 56 is a printed circuit board 64 on which is located a CPU 66, an LED (light emitting diode) 68, a EEPROM 70 and an integrated circuit 72. Mounted between the floor portion 62 and the printed circuit board 64 is a battery 74 for supplying power to the integrated circuit elements on the printed circuit board. The switch 40 mounted on the front face portion 42 of the housing 56 will, when actuated, enable the battery 74 to supply power to the LED 68 for use in programming the operation of the scanner 32. The cable 54 extending from the scanner 32 includes a conductor 76 which is connected to the printed circuit board 64.

Figure 3:
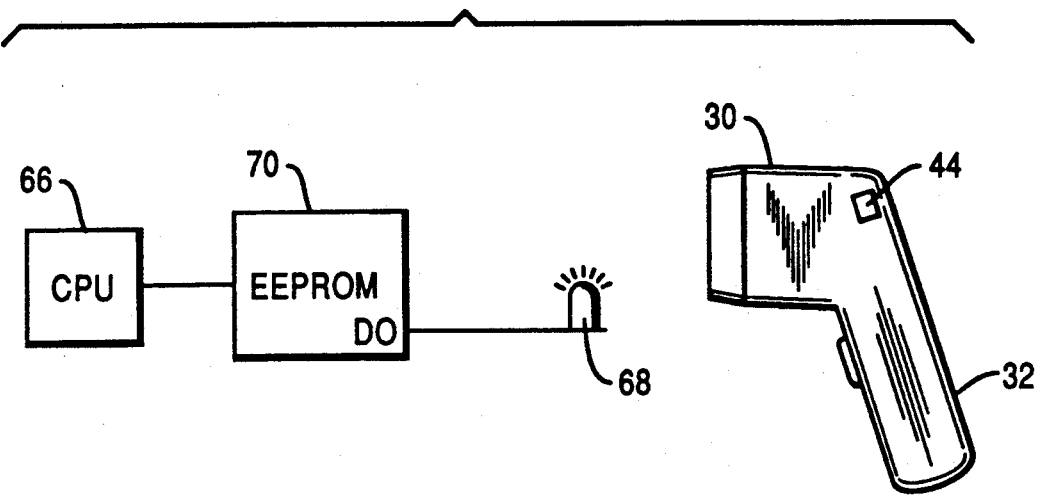
FIG. 3 is a a schematic representation of the system for programming the hand-held bar code scanner.

Referring to FIG. 3, there is shown a schematic representation of the system for programming the bar code scanner 32 including the CPU 66 which is programmed to output control signals to the EEPROM 70 representing program data. In response to receiving the control signals, the EEPROM 70 will output a plurality of data signals to the LED 68 enabling the LED to be turned on and off in accordance with the data signals received from the EEPROM member 70. When the switch 44 on the scanner 32 is actuated, the scanner 32 will be put into a programming mode to scan the operating condition of the LED 68 resulting in the programming of the scanner 32 to scan a predetermined type of coded label for use in identifying the merchandise item on which the coded label is attached.

Figure 4:
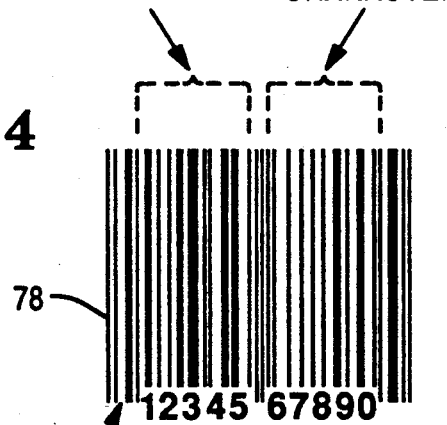
FIG. 4 is a graphical representation of a UPC bar code label.

Referring now to FIG. 4, there is shown a graphical representation of a symbol or coded label such as a UPC coded symbol which is scanned by the scanner 32 for generating coded data identifying the merchandise item to which the coded label is attached. As shown, each encoded UPC character is made up of 2 dark bars and 2 light spaces each composed of a different number of predetermined width modules. By assigning a 1 which corresponds to a black module and 0 to a white module, the left hand character represents (0101111) which denotes the character 6 and the right hand character represents (0001101) which denotes the character 0. The structure of the character code is not uniquely determined by each character, but is different according to which side of the center of the UPC symbol the character is located on. It is thus arranged that the light modules and the black modules are reversed as the character is located on the right or left sides, and as a result an odd number of black modules is included in each character code on the left hand side and an even number of black modules is included in each character code on the right hand side. This parity relation provides information for determining the read-out direction of the codes. With this arrangement, the left-hand character always starts with light bars and the right-hand character always starts with dark bars (reading left to right). In the present embodiment, the energizing of the LED 68 will represent a dark bar 78 while the deenergizing of the LED represents the space 80. The scanner 32 includes a microprocessor (not shown) which will decode the data generated by the operation of the LED member for use in programming the scanner.

Figure 5:
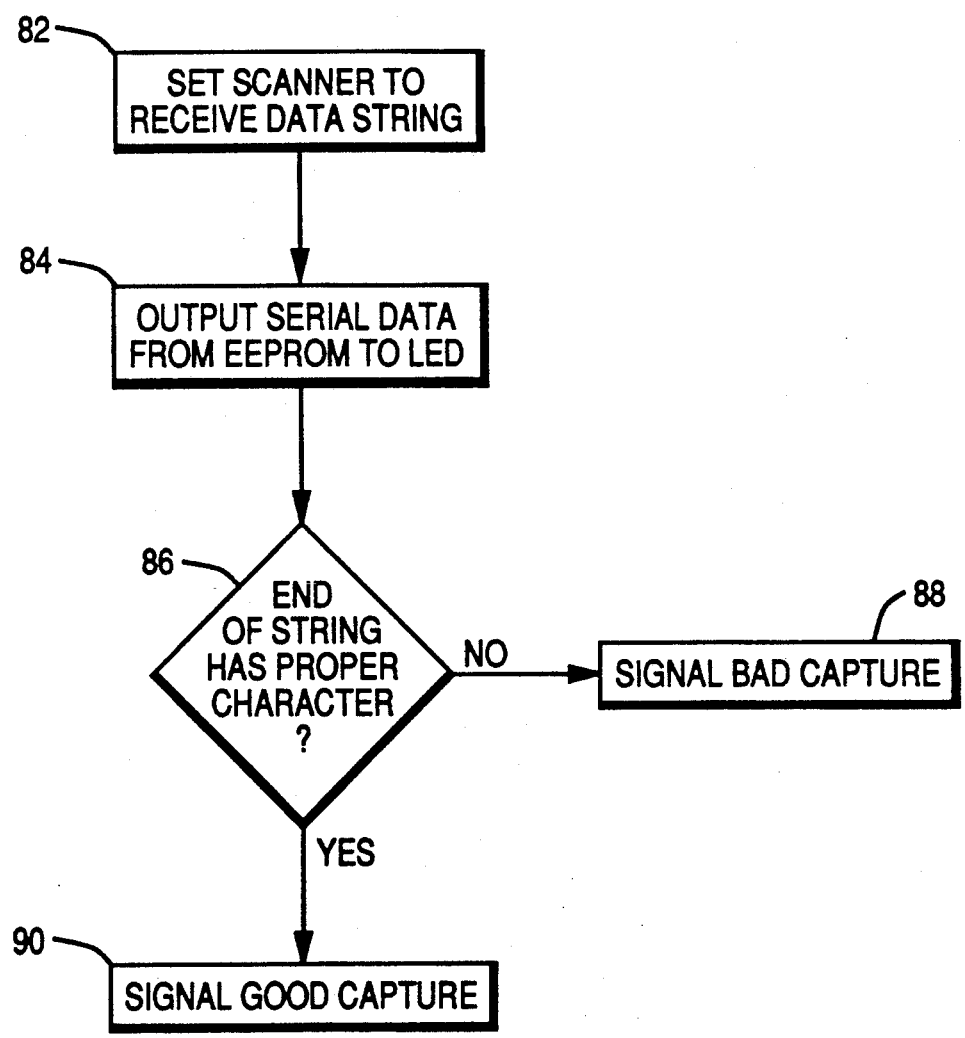
FIG. 5 is a flow diagram illustrating the method for changing the operating functions of the bar code scanner.

Referring now to FIG. 5 there is shown a flow diagram illustrating the method for programming the scanner 32 which includes setting the scanner to a programming mode to receive the programming data string (block 82) from the LED 68 by actuating the switch 44 on the scanner 32 (FIG. 1). The operator will then actuate the switch 40 (FIG. 1) on the housing 56 enabling the EEPROM 70 to output the predetermined serial data to the LED 68 (block 84), operating the LED in accordance with the level of the signal received. The scanner 32 will sense the operating condition of the LED 68, enabling the scanner to generate data in accordance with the data transmitted to the LED from the EEPROM 70. The data outputted from the EEPROM 70 will include a special character signaling the end of the string of data outputted by the operation of the LED 68. The scanner 32 will detect whether that character is present (block 86), indicating the end of the string of data. If the special character is not present, the scanner 32 will energize the indicator light 48 (FIG. 1) indicating that the data string was not captured (block 88). If the special character is present, the scanner 32 will energize the indicator light 50 indicating that the data string has been captured (block 90) and that the scanner has been programmed in accordance with the data outputted by the EEPROM 70. It will be seen from this arrangement that the scanner can be programmed at any location, at any time that is feasible to the operation of the checkout system and that positive feedback is present to indicate to the operator that the scanner has been properly programmed.

Although the preferred embodiment of the present invention has been described herein, it is not intended that the invention be restricted thereto, but that it be limited only by the true spirit and the scope of the appended claims.

What is claimed is:

1. An apparatus associated with a data terminal device for programming an optical bar code reader which reads bar code labels comprising:

a housing member having an enclosed area including a supporting surface having an aperture therein for supporting the scanning end of an optical bar code reader, said housing member having a floor portion located adjacent to said aperture;

a printed circuit board mounted on said floor portion adjacent the aperture;

processing means mounted on said printed circuit board for storing and transmitting binary data for programming the bar code reader;

storage means mounted on said printed circuit board and coupled to said processing means for receiving and storing the binary data transmitted from said processing means, said storage means adapted to output the binary signals when operated;

a light emitting diode mounted on said printed circuit board adjacent said aperture and coupled to said storage means for generating a plurality of energized and de-energized light indications representing the binary data stored in the storage means when operated;

battery means secured to said printed circuit board supplying electrical power to said processing means, said storage means and said light emitting diode;

first switch means mounted on the side of said housing member and coupled to said storage means for operating said storage means to output the binary data to said light emitting diode when actuated; and second switch means mounted on the optical bar code reader enabling, when operated, the bar code reader when mounted in said housing member to read the programming data represented by the light indications of the light emitting diode enabling the bar code reader to be programmed in accordance with the binary data stored in the storage means.

2. The apparatus of claim 1 in which the binary data outputted by the storage means includes a special binary data signal indicating the end of the binary data outputted by the operation of the light emitting diode.

3. The apparatus of claim 2 in which the bar code reader includes indicator means which is operated by the bar code reader when the special binary data signal is not detected by the bar code reader indicating that the binary data signals were not read by the bar code reader.

* * * * *